(No Model.)

W. C. A. THIELEPAPE.
Station Indicator.

No. 235,715.                 Patented Dec. 21, 1880.

3 Sheets—Sheet 1.

Witnesses:
F. W. Kasehagen.
O. W. Marble.

Inventor:
Wilhelm C. A. Thielepape.
By Lotz & Dyer,
Attys.

(No Model.) 3 Sheets—Sheet 2.
W. C. A. THIELEPAPE.
Station Indicator.
No. 235,715. Patented Dec. 21, 1880.
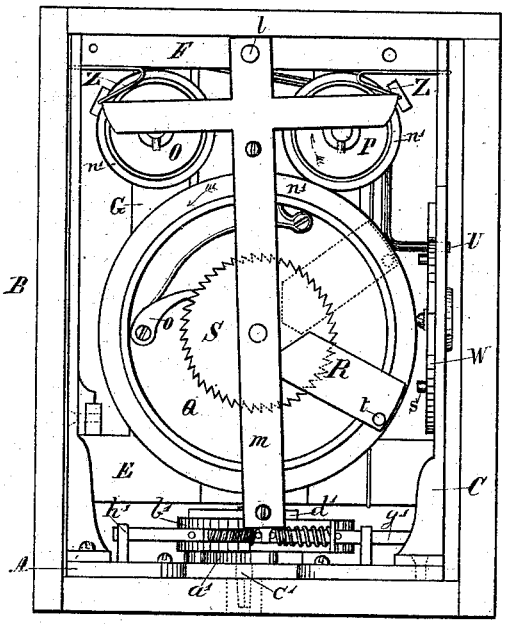
Fig. 3.
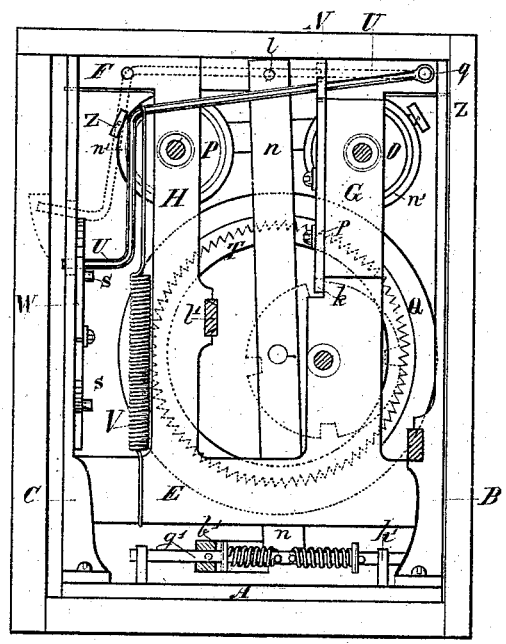
Fig. 4.
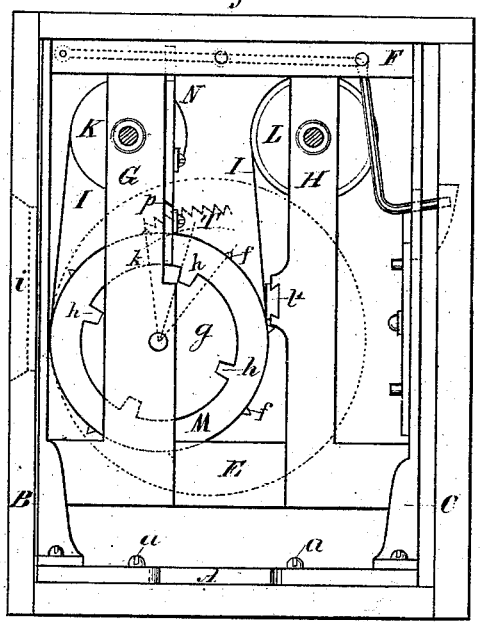
Fig. 5.
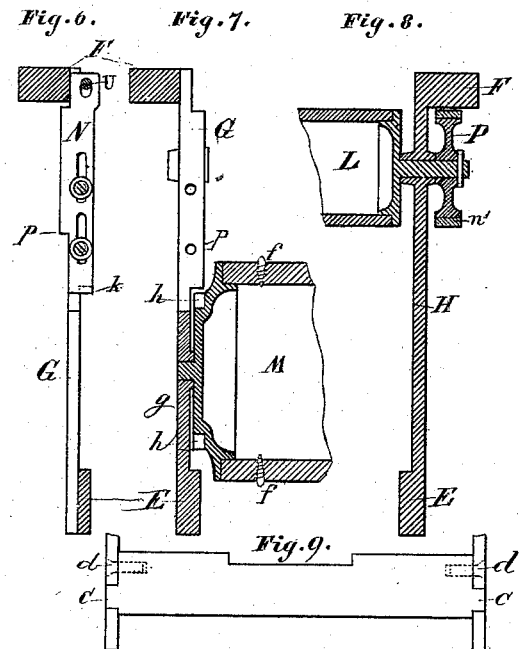
Fig. 6.  Fig. 7.  Fig. 8.
Fig. 9.
Witnesses:
F. W. Kasehagen.
O. W. Marble.
Inventor:
Wilhelm C. A. Thielepape
By Lotz & Dyer.
Attys.

(No Model.) 3 Sheets—Sheet 3.
W. C. A. THIELEPAPE.
Station Indicator.
No. 235,715. Patented Dec. 21, 1880.
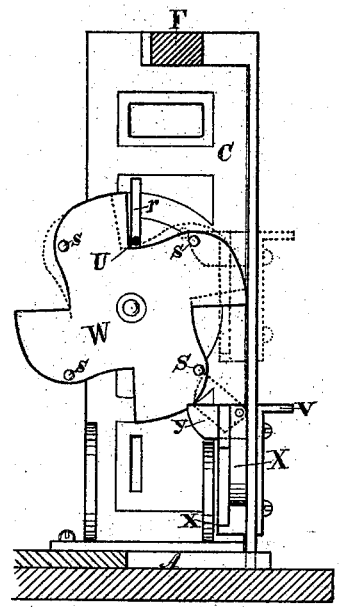
Fig. 10.
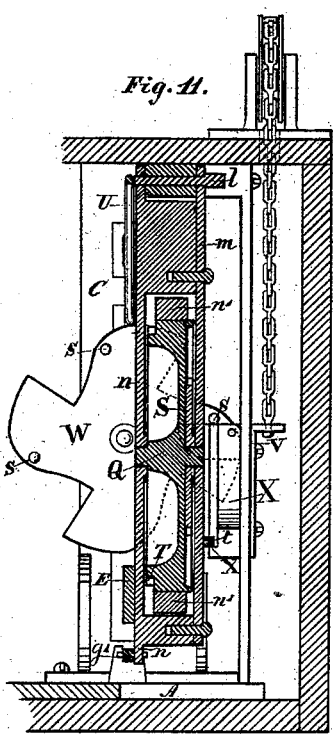
Fig. 11.
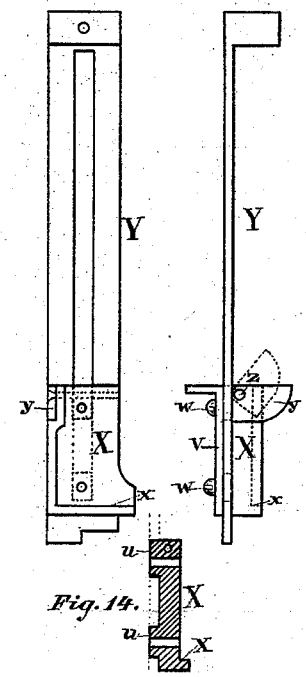
Fig. 12. Fig. 13.
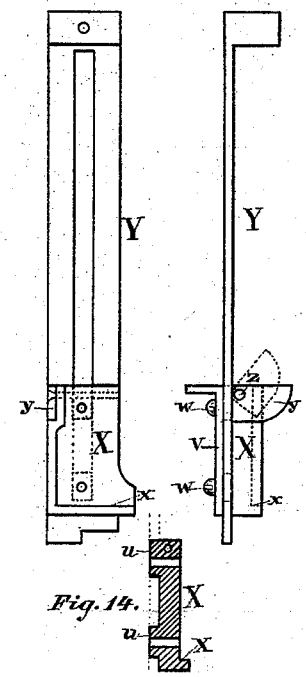
Fig. 14.
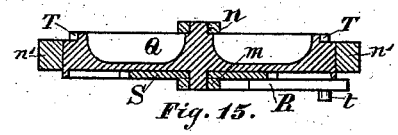
Fig. 15.
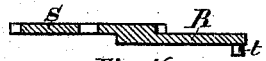
Fig. 16.
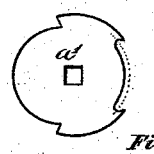
Fig. 17.
Fig. 24. Fig. 25.
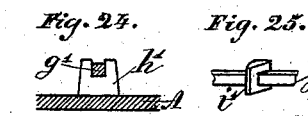
Fig. 26. Fig. 27.
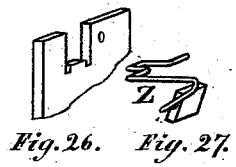
Fig. 18.
Fig. 20.
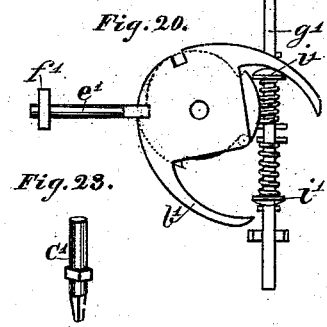
Fig. 21.
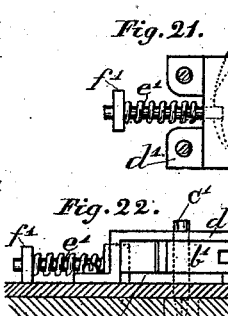
Fig. 23.
Fig. 19.
Fig. 22.
Witnesses:
F. W. Kasehagen.
O. W. Marble.
Inventor:
Wilhelm C. A. Thielepape
By Lotz & Dyer,
Attys
N. PETERS, PHOTO-LITHOGRAPHER, WASHINGTON, D. C.

UNITED STATES PATENT OFFICE.

WILHELM C. A. THIELEPAPE, OF CHICAGO, ILLINOIS.

STATION-INDICATOR.

SPECIFICATION forming part of Letters Patent No. 235,715, dated December 21, 1880.

Application filed October 12, 1880. (No model.)

*To all whom it may concern:*

Be it known that I, WILHELM C. A. THIELE-PAPE, of Chicago, in the county of Cook and State of Illinois, have invented a certain new and useful Improvement in Street and Station Indicators, of which the following is a specification.

The object I have in view is to produce a machine for indicating streets or stations to passengers of railway-cars, which will be simple in construction and easy and certain in operation, can be readily changed so as to repeat the streets or stations in the reverse order, and will fulfill all the conditions and supply all the wants in apparatus for this purpose.

My invention consists in the several peculiar devices and combinations of devices employed by me, as fully hereinafter explained, and pointed out by the claims.

Figure 1:
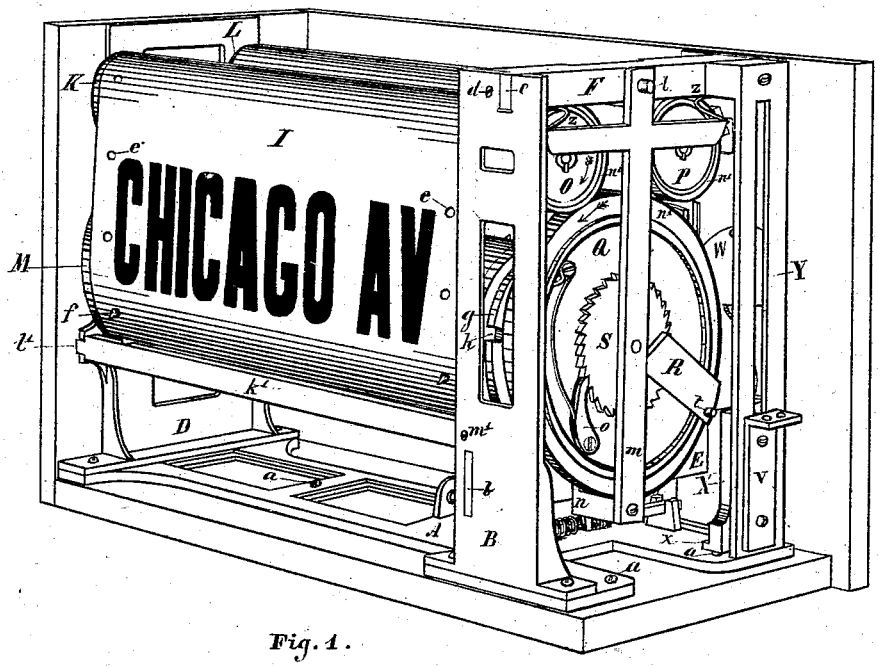
Figure 2:
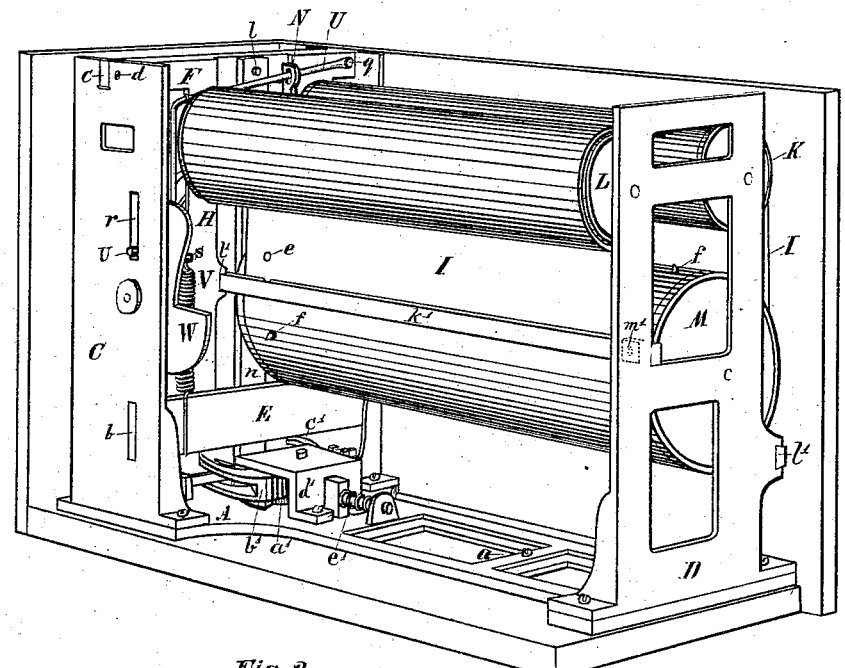

In the accompanying drawings, in which similar letters of reference indicate like parts, Figure 1 is a perspective view of the mechanism in the inclosing-box, with the front, the right-hand side, and the top board of the box removed. Fig. 2 is a perspective view of the same in an opposite direction. Fig. 3 is an end elevation of the same when the right-hand-side board of the box is removed. Fig. 4 is a vertical cross-section at the middle frame, looking toward the right of the box. Fig. 5 is a vertical cross-section at the middle frame, looking toward the left of the box; and Figs. 6 to 27, inclusive, are detail views of different parts of the mechanism, as will be explained in the course of this specification.

The scale of the drawings is one-half of the real size.

On the bottom of the box which incloses the mechanism rests the foot-plate A, secured by three screws, *a*. This plate supports the three outer frames, B, C, and D, and the middle frame, consisting of the parts E F G H, cast in one piece and mounted on the frames B and C by means of projections *b* and *c* at the ends of the horizontal pieces E and F, which project into apertures provided for them in the frames B and C, and are there secured by the screws *d*, Figs. 1, 2, and 9. The three upright frames B, C, and D are secured to the foot-plate by screws.

The names of the streets or stations are printed in succession on a strip of cloth, I, wound upon the rollers K and L, and passing over a third roller, M, and extending at the same time past the glazed opening *i* in the inclosing-box, as indicated in Figs. 1, 2, and 5.

The rollers K and L are mounted in bearings provided for them in the uprights G and H of the middle frame and in the end frame, D. These rollers are located so that the center lines of their shafts are horizontally in the same plane and vertically in planes parallel to each other. The center line of the roller M must be parallel in both directions to those of the rollers K L.

As the rollers K and L, upon which the cloth is mounted, change their respective circumferences when one is winding while the other is unwinding the cloth, it is obvious that their revolutions differ in comparison with the same length of cloth that is wound or unwound.

The names being printed at equal distance from each other and occupying the same space in width, the cloth must always be advanced the same distance in order to bring the names behind the center of the glazed opening of the box. A measuring medium, to control the travel of the cloth, is therefore required, which office is performed by the roller M, around which the cloth partly extends in passing from one of the rollers K and L to the other. The cloth causes the roller M to turn on its shaft, and, in case the cloth does not in any way slip, a strip of it will pass by one point of the glazed opening *i* of the box equal in length with that of the circumference of the roller M when the latter has made one revolution. The diameter of the roller M is therefore made so as to procure a length of its circumference equal to that of so much cloth as is needed for four names and four spaces.

In order to prevent a slipping of the cloth on the roller M, the cloth is provided lengthwise on each side with holes *e*, punched at equal distances apart. These holes correspond exactly with conical-shaped screw-heads *f*, Figs. 1, 2, 5, and 7, on each end of the surface of the roller M, placed at equal distances from each other, and dividing the circumference of the roller into eight equal parts. It is advisable to use this number of screw-heads in order to distribute the strain brought upon the cloth at the holes *e* by the screw-heads *f* when turning the roller M.

The circumference of the roller M being equal with the exact length of four names and four spaces on the cloth, it is obvious that one name will be changed for the next one at the glazed opening of the box by causing the roller M to make exactly one-fourth of one revolution, at which point it must then be checked. To accomplish this the roller M is provided at its end nearest the middle frame with a circular plate, *g*, divided at its periphery into four equal parts by the notches *h*.

In connection with the notch-plate *g* operates the detent N, sliding in a vertical direction on the upright G, and held by means of slots and screws, as shown in Figs. 4, 5, 6, and 7. The edge *k* of the detent engages with the notches of the plate *g*, and when locked therewith prevents the roller M from revolving. The detent, when raised out of each notch, slides on the periphery of the notch-plate and drops into the next notch, so as to stop roller M when each name is displayed at the glazed opening.

Having explained the means by which the revolutions of the rollers K and L are controlled, I shall now describe the mechanism by which these rollers are set in motion.

As the rotation of one of these rollers in the direction of winding the cloth causes the rotation of the other roller in the opposite direction, it is sufficient to act on one of the rollers K and L at a time. For that purpose the rollers K and L are provided with rubber-faced wheels O and P, respectively, mounted on the shafts of the rollers extended through the bearings in the uprights of the middle frame. These wheels are turned, one at a time, by the large wheel Q, mounted in a frame that swings on the pivot *l*, so that it can be put in contact with one or the other of the wheels O and P by moving the lower end of the frame toward either wheel, as shown in Figs. 1, 3, and 4.

The construction of the swinging wheel-frame is shown in Figs. 1, 2, 3, and 4, and also by Figs. 11 and 15, the former being a longitudinal section, and the latter a cross-section, of such frame and its wheel. This swinging frame consists of two parts, the front part, *m*, and the rear part, *n*. The latter part is provided with two projections, one above and one below the wheel, to which the front part, *m*, is fastened by screws. This arrangement forms a slot, in which the wheel Q turns on journals mounted in the bearings of the frame. The upper part of the frame is pivoted to the horizontal piece F of the middle frame by the pivot *l*, upon which it swings.

There is pivoted loosely on the shaft of the wheel Q a lever, R. This lever is cast in one piece with the ratchet-wheel S, Figs. 1, 3, 15, and 16, and a pawl, *o*, is pivoted to the wheel Q and engages with such ratchet-wheel, so as to turn the wheel Q in the direction of the arrow when the lever is raised by its knob *t* into the position indicated by the dotted lines in Fig. 3. The lever R, however, is allowed to move back to its former position without affecting the wheel Q. The shape of the lever R and its conjunction with the ratchet-wheel S is given in Figs. 15 and 16, the latter being a longitudinal section of the lever and ratchet-wheel.

The wheel Q is further provided with a ratchet-wheel, T, cast on its back, as shown in Figs. 4, 5, and 15. This ratchet-wheel T causes the checking of the wheel Q by the engaging of the edge *p* of the detent N, Figs. 4, 5, and 6, with the teeth of the ratchet-wheel at the same time that the edge *k* of the detent N drops into the notch *h* of the notch-plate *g*.

The detent N is raised, and is also held down, by the lever U, to which the wire spring V is attached to draw such lever downward. The lever U turns at its upper end upon the pivot *q*, which is fastened in the upper piece, F, of the middle frame, Figs. 2, 4, and 5. The lever then passes through a slot in the upper end of the detent N, Figs. 2, 4, and 6, and is bent downward and outward, and enters a slot, *r*, provided for it in the frame C, Figs. 2 and 10. The raising of the lever at this end will raise the detent N, and that is done by the cam-wheel W, Figs. 1, 2, 3, 4, 5, 10, and 11, which turns upon a pivot fastened in the frame C. This cam-wheel is formed into four eccentrics, by the rotation of which the end of the lever U is forced upward in the slot *r*.

Fig. 10 shows the lever U in its lowest position. Fig. 11 indicates the same when raised by the cam-wheel to its highest point.

The cam-wheel has four knobs or studs, *s*, by which it is turned by the slider X, Figs. 1, 10, 11, 12, and 13, which is mounted in the slotted standard Y, by means of the projections *u*, the plate *v*, and the screws *w*, as shown more clearly in Figs. 12, 13, and 14. The top part of the plate *v* is bent at right angles to the body of the plate, so as to serve as a link to fasten a chain to for operating the slider. The chain extends upward from the plate *v*, and runs over a pulley, Fig. 11, above the box, and is there attached to a wire that terminates at the platform of the car.

The slider X carries two essential parts for transmitting motion: first, the projecting edge *x*, which acts on the knob *t* of the lever R; and, second, the link *y*, which serves to turn the cam-wheel W by striking one of its knobs *s*. This link *y* turns upon the pivot *z* in a recess of the slider X, Figs. 12, 13, and 14.

The principal parts having been described, the operation of the machine is as follows: The pulling on the wire at the platform of the car causes the slider X to move in a vertical direction. Its link *y* will pass under the knob *s* of the cam-wheel W, that is next above it, and will cause the rotation of that wheel, and through it the raising of the lever U, Figs. 10 and 11. This motion will raise the detent N and free the wheel Q and the roller M from its checking effect. This movement is illustrated in Figs. 5 and 11, showing at the same time that the edge $x$ of the slider X has passed under the knob $t$ of the lever R, and will, in moving on, raise the same—that is, it will turn, through that lever, the wheel Q. The rotation of this wheel will cause the rotation of one of the rubber-faced wheels O and P, with which it has been set in contact, and also the roller connected with the wheel. This roller will wind the cloth and draw the same by the glazed opening of the box. While this is going on, the link $y$ of the slider X has passed by the knob $s$ of the cam-wheel W, turning the latter as far as is indicated by the dotted line in Fig. 10. The end of the lever U not being any longer supported, will be forced by the wire spring V to move downward; but this is to some extent hindered by the detent N, whose edge $k$ is sliding on the periphery of the notch-plate $g$, Fig. 5, and is held up thereby until the detent drops into the next notch. When the detent drops into the notch it will also set into the ratchet-wheel T and stop the motion of the wheel Q, and by this the rotation of the rollers K, L, and M and the motion of the cloth I. When the rollers are thus stopped the next name in succession has been moved into position behind the glazed opening. The motive power at the platform of the car being removed, the slider X, and with it the lever R, will, on account of their weight, fall into their respective positions of rest, the latch $y$ of the slider being turned on its pivot in passing the knobs of the cam-wheel W. Everything is now in ready order for renewing the operation, which will be done successively until the last name of the streets on the cloth has appeared behind the glazed opening of the box. In making the return-trip the names of the streets have to appear in the reversed succession. This is accomplished by setting the wheel Q in contact with the wheel on the shaft of that roller on which the cloth has run out. Thus, if the wheel Q were first placed in position, as shown in Fig. 1, to act on the wheel O, it must now be set into the position indicated by Fig. 3, to act on the wheel P and to cause the winding of the cloth on the roller L. The cloth will, by this change, run in an opposite direction from what it did before, and the names of the streets will pass behind the glazed opening of the box in reversed succession.

To perform the necessary change in the location of the wheel Q a most simple manipulation is to be performed. The mechanism for this purpose is illustrated by Figs. 17 to 25, inclusive, and consists of the bottom plate, $a'$, of which Fig. 17 is a top view. This plate is attached to the pivot $c'$ by a square shoulder, so as to turn therewith. The pivot turns in a bore of the foot-plate A of the frame at its lower end, and at its top end in a bore of the cover-plate $d'$, which latter is fastened by two screws to the foot-plate A, Figs. 21 and 22. The lower end of the pivot is squarely shaped, to fit the hole of a common clock-key, by which it is turned. The bottom of the box is provided for that purpose with a suitable bore, so that the lower end of the pivot can be turned from the outside of the box. (See Fig. 22.) Resting on the bottom plate, $a'$, and turning upon the pivot $c'$, is the slotted arm-plate $b'$, of which Fig. 18 is a top view and Fig. 19 a cross-section. It is provided with two square notches on its round part and with a stud on its lower side, centrally opposite to the two notches. This stud fits each of the two half-round notches of the bottom plate, $a'$, by which the stud, and through it the slotted arm-plate $b'$, is turned upon the pivot $c'$ by means of the clock-key. The bottom plate, $a'$, is provided with an eccentric portion opposite the notches, which is a semicircle with a smaller radius than the radius of the circle of the entire plate, and by its form produces two shoulders, one at each end of the eccentric portion.

For the purpose of holding the slotted arm-plate $b'$ in the opposite positions, indicated by the Figs. 20 and 21, I provide the spring-bolt $e'$, the head of which slides in a slot in the cover-plate $d'$, and the shank of which moves in a guide, $f'$, cast to the foot-plate A. When the slotted arm-plate is turned out of the position shown by Fig. 20 into that shown in Fig. 21 the bottom plate, $a'$, is turned by the pivot $c'$ in the same direction. By this motion the eccentric circle of the bottom plate is made to strike against the head of the spring-bolt, moving the same out of the square notch of the arm-plate $b'$. At this time the stud of the arm-plate has entered one of the half-round notches of the bottom plate, $a'$, and is, by a further turning of the latter, moved in the direction required. When one of the half-circular notches of the bottom plate, $a'$, is in contact with the stud of the arm-plate $b'$ the shoulder in the bottom plate opposite that particular half-circular notch coincides with the square notch of the arm-plate, into which square notch the spring-bolt will enter when the movement is completed, and fix the position of the parts.

To explain the relative location of the half-circular and square notches, the shoulders, and the stud, as described on the two plates $a'$ and $b'$, it is sufficient to state that the dotted radii in Fig. 18 divide the surface into ten equal parts.

By turning the slotted arm-plate in one or the other direction the rod $g'$, Figs. 20 and 21, is also moved in the same direction. This rod slides in apertures provided for it in the guide-stands $h'$, Figs. 20, 21, and 24, and within one of the slots of the arm-plate $b'$, Figs. 19, 20, 21, and 22.

The rod $g'$ is provided with two pins at its center, against which the wire springs around it act alternately when pressed by the respective arms of the arm-plate $b'$, which press on the sliding plates $i'$, Figs. 20, 21, and 25.

The two outer pins of the rod $g'$ hold the sliding plates $i'$ in a position within the curve described by the inside line of the arms of the arm-plate $b'$. The rod $g'$ is, furthermore, so located on the foot-plate A of the frame that the lower end of the back part, $n$, of the swinging frame of the wheel Q will rest between the two inner pins of the rod $g'$, Figs. 3, 4, and 11. The springs of this rod are to be adjusted in their strength so that the wheel Q is pressed sufficiently toward the wheel O or P to secure the turning of the same with the wheel Q. The use of these springs secures a smooth and easy operation of the wheel Q on the other wheels. Now, to operate this part of the mechanism, in order to move the frame of the wheel Q so as either to act on the wheel O or P, and by this to reverse the movement of the cloth I, all that is necessary to be done is to turn the pivot $c'$ by the clock-key toward the wheel O or P, as desired. The cloth having a tendency to unfold and to unwind itself from the rollers K and L, it is necessary to check the rollers, as the operation of the mechanism is at once disturbed by the slipping of the cloth off of the conical-shaped screw-heads $f$ on the roller M. To avoid this the springs Z, Figs. 1, 3, and 27, are used to cause a friction on the wheels O and P, respectively, and the wooden strips $k'$, Figs. 1 and 2, are also used to prevent the cloth from getting out of order in case its unfolding tendency should loosen the cloth from the circumference of the roller M.

The springs Z, preferably made of piano-string wire, are provided at one end with a small piece of india-rubber, as shown by Fig. 27, and are fastened in the frames B and C by means of the notches made for that purpose in the horizontal side of the openings $c$, as shown by Fig. 26. The wire, bent in the form given by Fig. 27, and placed in those notches, is secured in that position by the ends of the upper piece, F, of the middle frame, which set into the openings $c$. The pieces of india-rubber will be pressed by the wires against the periphery of the wheels O and P, and will prevent them from being turned when out of contact with the wheel Q by the unfolding tendency of the cloth. That wheel which is in contact with the wheel Q does not require any more friction, and is freed from the pressure of the india-rubber on the spring Z by the horizontal arms cast on the frame of the wheel Q, as shown in Figs. 1 and 3. The springs are lifted out of position by the arms when the wheel Q is moved by its frame toward the wheel O or P. The ends of the arms are provided with small notches to secure the springs.

The two small wooden strips $k'$, Figs. 1 and 2, mentioned before, are located lengthwise close to the roller M on opposite sides of it, and are secured there at one end by being set into dovetail-shaped apertures $l'$, provided for them in projections of the frame-pieces D and H, as illustrated by Figs. 1 and 2, and at their other ends by means of screws $m'$, which fasten them to the frame-pieces B and D, as indicated in the same figures. The wooden strips are provided with notches, in order to allow the screw-heads on the roller M to pass by. (See Figs. 1 and 2.)

The cloth on which the names are printed must be thin, but strong, and be prepared against pulling out of shape. I prefer to use tracing-linen for this purpose.

The rollers are made of paper, mounted on cast-iron heads, as shown by Figs. 7 and 8.

In Fig. 8 the mode is illustrated by which the screw-heads are fastened in the paper-cylinder of the roller M.

The wheels O, P, and Q are provided with suitable rims $n'$, of india-rubber, as indicated in Figs. 1, 3, 4, 8, 11, and 15, to secure a better friction and a smooth action by less pressure.

The parts of the machine having been properly put together and adjusted, the box is secured in place within the car, and the chain is connected with a wire leading to one or both platforms. At each platform the wire may be connected with a hand-lever, by which it can be readily pulled, and this wire, at any suitable point, is provided with one or more springs, which will draw it back into its normal position after the driver has pulled it forward to operate the indicating mechanism.

What I claim as my invention is—

1. In a street or station indicator, the combination of the independent power-rollers K L and measuring-roller M, all journaled in stationary bearings and not connected, except by the name-strip, with the operating-wheel Q, mounted in a swinging frame and adapted to be swung so as to act on either of said power-rollers, as desired, substantially as described and shown.

2. In a street or station indicator, the combination of the independent power-rollers K L and measuring-roller M, all mounted in stationary bearings, and not connected, except by the name-strip, with friction-wheels O P on the shafts of such power-rollers, and the operating friction-wheel Q, mounted in a swinging frame and adapted to be swung into contact with either of said friction-wheels O and P, substantially as described and shown.

3. In a street or station indicator, the combination, with the winding-rollers and the swinging operating-wheel, of a swinging lever connected by a pawl and ratchet with said wheel, and a vertically-moving slider engaging with a stud on the end of such lever, substantially as described and shown.

4. In a street or station indicator, the combination, with the rollers K, L, and M, the operating-wheel Q, and the ratchet-lever R, of the detent N, for holding the roller M and wheel Q in fixed positions, and the vertically-moving slider X, which raises said detent before it strikes the lever R, substantially as described and shown.

5. In a street or station indicator, the combination, with the rollers K, L, and M, wheel Q, and lever R, of the slider X, having shoulder $x$ and pivoted latch $y$, the detent N, lever U, and cam-wheel W, substantially as described and shown.

6. In a street or station indicator, the combination, with the winding-rollers K and L and the operating-wheel Q, mounted in a swinging frame, of the spring-brakes Z, bearing on the wheels of the winding-rollers and alternately raised therefrom by the swinging frame, substantially as described and shown.

7. In a street or station indicator, the combination, with the winding-rollers and the swinging operating-wheel and frame, of a horizontal sliding spring-rod connected centrally with the lower end of such frame, and means for moving such spring-rod alternately in opposite directions and locking it at the end of its movement, substantially as described and shown.

8. In a street or station indicator, the combination, with the swinging operating-wheel and frame, of the horizontally-sliding spring-rod $g'$, connected with such swinging frame and moving the same, the pivoted plate $b'$, having forked arms which embrace said spring-rod and give motion to the same, the spring-bolt $e'$, for locking the arm-plate in reverse positions, the plate $a'$, having a cam-surface which forces back said spring-bolt to release the arm-plate and provided with notches which engage with a pin on the arm-plate for moving such arm-plate, and the pivot $c'$, secured to the cam-plate and turning loosely through the arm-plate, all substantially as described and shown.

WILHELM C. A. THIELEPAPE.

Witnesses:
F. W. KASEHAGEN,
O. W. MARBLE.